United States Patent
Tanaka (10) Patent No.: US 9,570,899 B2
(45) Date of Patent: Feb. 14, 2017

(54) CONNECTOR WITH RUBBER PLUG, RETAINER FOR RETAINING RUBBER PLUG AND A GUIDE FORMED ON A REAR PART OF THE RETAINER FOR ACCOMMODATING BENDING OF WIRES

(71) Applicant: Sumitomo Wiring Systems, Ltd., Yokkaichi, Mie (JP)

(72) Inventor: Yukari Tanaka, Mie (JP)

(73) Assignee: SUMITOMO WIRING SYSTEMS, LTD, Yokkaichi, Mie (JP)

( * ) Notice: Subject to any disclaimer, the term of this patent is extended or adjusted under 35 U.S.C. 154(b) by 156 days.

(21) Appl. No.: 14/539,064

(22) Filed: Nov. 12, 2014

(65) Prior Publication Data

US 2015/0144396 A1  May 28, 2015

(30) Foreign Application Priority Data

Nov. 28, 2013  (JP) .................................. 2013-245911

(51) Int. Cl.
*H02G 15/007* (2006.01)
*H02G 15/013* (2006.01)
*H02G 15/04* (2006.01)

(52) U.S. Cl.
CPC .......... *H02G 15/007* (2013.01); *H02G 15/013* (2013.01); *H02G 15/04* (2013.01)

(58) Field of Classification Search
None
See application file for complete search history.

(56) References Cited

U.S. PATENT DOCUMENTS

| 3,771,099 | A | * | 11/1973 | Dinse | H01R 13/005 439/191 |
| 4,653,182 | A | * | 3/1987 | Fukuda | B23P 19/007 29/235 |
| 4,997,395 | A | * | 3/1991 | Inoue | H01R 13/5208 439/488 |
| 5,540,450 | A | * | 7/1996 | Hayashi | H02G 15/013 174/152 G |
| 5,607,318 | A | * | 3/1997 | Wakata | H01R 13/4223 439/274 |

(Continued)

FOREIGN PATENT DOCUMENTS

JP  2011-060451  3/2011

*Primary Examiner* — Chau N Nguyen
*Assistant Examiner* — Muhammed Azam
(74) *Attorney, Agent, or Firm* — Gerald E. Hespos; Michael J. Porco; Matthew T. Hespos (57) ABSTRACT

A connector (10) includes a housing (30) with a wire draw-out portion (34) from which wires (W) are drawn out. Rubber plugs (27) are accommodated in rubber plug accommodating portions (41) in the housing (30) and seal between the wires (W) and inner peripheral surfaces of the rubber plug accommodating portions (41). A back retainer (50) is mounted through a wire draw-out opening (34A) in the wire draw-out portion (34) and retains the rubber plugs (27). The back retainer (50) includes a retainer main body (52) for preventing backward movements of the rubber plugs (27) while allowing the insertion of the wires W therethrough. A position where the wires (W) are drawn out backward in the retainer main body (52) is closer to a back part of the wire draw-out portion (34) than the wire draw-out opening (34A).

7 Claims, 10 Drawing Sheets

(56) References Cited

U.S. PATENT DOCUMENTS

| | | | | |
|---|---|---|---|---|
| 5,618,202 A * | 4/1997 | Okuyama | H01R 23/662 | 439/497 |
| 5,629,627 A * | 5/1997 | Hoshino | G01R 31/045 | 324/538 |
| 5,718,596 A * | 2/1998 | Inaba | H01R 13/639 | 439/352 |
| 5,785,544 A * | 7/1998 | Linden | H01R 13/622 | 439/277 |
| 5,997,349 A * | 12/1999 | Yoshioka | H01R 9/038 | 439/579 |
| 6,004,164 A * | 12/1999 | Seko | H01R 13/4365 | 439/752 |
| 6,036,553 A * | 3/2000 | Seko | H01R 13/4365 | 439/752 |
| 6,039,605 A * | 3/2000 | Tanaka | H01R 13/6485 | 439/607.44 |
| 6,089,927 A * | 7/2000 | Seko | H01R 13/4365 | 439/752 |
| 6,118,076 A * | 9/2000 | Damm | H02G 15/013 | 174/77 R |
| 6,124,576 A * | 9/2000 | Zapf | H05B 3/746 | 219/464.1 |
| 6,186,829 B1 * | 2/2001 | Murakami | H01R 13/5205 | 439/274 |
| 6,270,377 B1 * | 8/2001 | Miyazaki | H01R 9/0527 | 439/607.41 |
| 6,280,237 B1 * | 8/2001 | Saka | H01R 13/4361 | 439/271 |
| 6,521,840 B1 * | 2/2003 | Kreutz | H02G 15/013 | 138/109 |
| D471,874 S * | 3/2003 | Kashiyama | D13/147 | |
| 6,709,282 B2 * | 3/2004 | Sugiyama | H01R 13/5208 | 439/274 |
| 6,887,106 B2 * | 5/2005 | Noguchi | H01R 13/65802 | 439/607.41 |
| 7,011,553 B2 * | 3/2006 | Hayashi | H01R 13/4367 | 439/460 |
| 7,033,217 B2 * | 4/2006 | Mase | H01R 13/4223 | 439/595 |
| 7,056,104 B2 * | 6/2006 | Kimura | F04C 18/0215 | 310/71 |
| 7,419,395 B2 * | 9/2008 | Tsuji | H01R 13/5221 | 439/271 |
| 7,597,563 B2 * | 10/2009 | Shinkawa | H01R 4/4809 | 439/98 |
| 7,675,206 B2 * | 3/2010 | Akutsu | H02K 11/21 | 310/112 |
| 7,922,530 B2 * | 4/2011 | Chazottes | H01R 13/5208 | 439/587 |
| 7,988,475 B2 * | 8/2011 | Sakakura | H01R 9/032 | 439/271 |
| 7,988,502 B2 * | 8/2011 | Nagano | H01R 13/424 | 439/595 |
| 7,997,916 B2 * | 8/2011 | Yoshioka | H01R 13/5205 | 439/271 |
| 8,803,006 B2 * | 8/2014 | Imahori | H01R 9/032 | 174/539 |
| 9,059,534 B2 * | 6/2015 | Endo | H01R 13/5205 | |
| 9,124,021 B2 * | 9/2015 | Kashiwada | H01R 13/512 | |
| 2001/0041470 A1 * | 11/2001 | Makita | H01R 13/5219 | 439/271 |
| 2001/0044228 A1 * | 11/2001 | Noro | H01R 13/62938 | 439/157 |
| 2002/0076996 A1 * | 6/2002 | Murakami | H01R 13/4365 | 439/752.5 |
| 2002/0106937 A1 * | 8/2002 | Ichio | H01R 13/4361 | 439/595 |
| 2002/0123257 A1 * | 9/2002 | Matsuoka | H01R 13/4361 | 439/271 |
| 2002/0142655 A1 * | 10/2002 | Nimura | H01R 13/4223 | 439/595 |
| 2002/0146943 A1 * | 10/2002 | Saka | H01R 13/432 | 439/748 |
| 2002/0177359 A1 * | 11/2002 | Fukatsu | H01R 13/5208 | 439/587 |
| 2002/0187676 A1 * | 12/2002 | Kurimoto | H01R 13/4362 | 439/595 |
| 2003/0054690 A1 * | 3/2003 | Fukatsu | H01R 43/16 | 439/595 |
| 2003/0085575 A1 * | 5/2003 | Crestin | H01R 13/59 | 285/382.7 |
| 2003/0226680 A1 * | 12/2003 | Jackson | H02G 15/04 | 174/655 |
| 2004/0016564 A1 * | 1/2004 | Lambert, Jr. | B29C 61/065 | 174/93 |
| 2004/0076466 A1 * | 4/2004 | Nakamura | H01R 13/4364 | 403/292 |
| 2004/0222007 A1 * | 11/2004 | Nakamrura | B60R 16/0207 | 174/650 |
| 2006/0063418 A1 * | 3/2006 | Motzigkeit | H02G 3/088 | 439/425 |
| 2007/0206914 A1 * | 9/2007 | Tapper | H02G 3/083 | 385/147 |
| 2008/0155816 A1 * | 7/2008 | Ikeda | H01R 43/005 | 29/748 |
| 2008/0261465 A1 * | 10/2008 | Hughes | H01R 13/187 | 439/889 |
| 2008/0299816 A1 * | 12/2008 | Itou | H01R 13/4364 | 439/383 |
| 2008/0318473 A1 * | 12/2008 | Morikawa | H01R 13/5208 | 439/588 |
| 2009/0191749 A1 * | 7/2009 | Mase | H01R 13/5205 | 439/397 |
| 2010/0261364 A1 * | 10/2010 | Matsuoka | H01R 13/5202 | 439/271 |
| 2011/0180319 A1 * | 7/2011 | Nagata | F16J 15/106 | 174/668 |
| 2011/0223792 A1 * | 9/2011 | Osawa | B60L 11/1818 | 439/345 |
| 2012/0083149 A1 * | 4/2012 | Uchida | H01R 13/502 | 439/345 |
| 2012/0270444 A1 * | 10/2012 | Kawamura | H01R 9/032 | 439/607.44 |
| 2013/0052864 A1 * | 2/2013 | Kataoka | H01R 13/5208 | 439/587 |
| 2013/0288542 A1 * | 10/2013 | Zheng | H01R 13/4223 | 439/744 |
| 2014/0051286 A1 * | 2/2014 | Itsuki | H01R 13/533 | 439/587 |
| 2014/0065865 A1 * | 3/2014 | Mizutani | H01R 13/4365 | 439/271 |
| 2014/0120767 A1 * | 5/2014 | Itsuki | H01R 13/5208 | 439/587 |

* cited by examiner

CONNECTOR WITH RUBBER PLUG, RETAINER FOR RETAINING RUBBER PLUG AND A GUIDE FORMED ON A REAR PART OF THE RETAINER FOR ACCOMMODATING BENDING OF WIRES

BACKGROUND

1. Field of the Invention

The invention relates to a connector.

2. Description of the Related Art

Japanese Unexamined Patent Publication No. 2011-60451 discloses a connector with terminals connected to ends of wires and a housing with side-by-side cavities that receive the respective terminals from behind. Adjacent cavities are partitioned by a partition wall extending to the rear end of the housing, and a rubber plug retained by a back retainer is mounted in a rear part of each cavity. The back retainer is mounted into the housing while allowing the insertion of a plurality of wires therethrough. A rear end of the back retainer where the wires are drawn out backward is at the same position as a rear end of the housing.

A space behind the connector may be narrow, such as when a peripheral device is arranged behind and near the connector. Thus, the wires are bent at a large angle with the rear end position of the housing as a bending start position, and loads on the bent wires is large. Each wire may need to be drawn out laterally in the wire arrangement direction. Thus, the wires cannot be bent due to mutual interference and a large bending angle. Accordingly, freedom in arranging the wires may be impaired.

The invention was completed based on the above situation and an object thereof is to improve a degree of freedom in arranging wires while reducing loads on the wires due to bending.

SUMMARY OF THE INVENTION

The invention is directed to a connector with a housing that includes a wire draw-out opening from which wires are drawn out. A rubber plug is accommodated in the housing and seals between the wires and an inner peripheral surface of the housing. A retainer is mounted into the housing at the wire draw-out opening and retains the rubber plug. The retainer includes a retainer main body for preventing a movement of the rubber plug in a direction to come out while allowing the insertion of the wires therethrough. A position where the wires are drawn out in the retainer main body is closer to a back part of the housing than the wire draw-out opening. Accordingly, the wires can be bent at a moderate angle, since a bending start position of the wires is closer to the back part of the housing than the wire draw-out opening. In this way, loads on the wires can be reduced. Further, mutual interference of the wires near the wire draw-out opening can be reduced and a degree of freedom in arranging the wires can be improved when bending each wire in an arrangement direction of the wires.

A guide may extend from the retainer main body to the wire draw-out opening along the inner peripheral surface of the housing. Accordingly, the retainer main body can be arranged in the back part of the housing without being set in an improper posture by sliding the guide along the inner peripheral surface of the housing to guide the retainer main body to the back part of the housing. Thus, operation efficiency in mounting the retainer is improved as compared with retainers including no guide.

Cavities for individually accommodating the wires may be provided side by side in a row while being partitioned by one or more partition walls in the housing. A space where the wires drawn out from the retainer main body are arranged may be continuous in an arrangement direction of the wires by cutting the partition walls between the cavities from the retainer main body to the wire draw-out opening. Accordingly, each wire can be bent to enter the adjacent cavity since there is no partition wall in the area from the retainer main body to the wire draw-out opening. This enables the wires to be bent at a more moderate angle. Further, mutual interference of the wires near the wire draw-out opening can be reduced further so that the degree of freedom in arranging the wires can be improved.

A metal shield bracket may be provided and a shield member for covering the wires may be connected to the shield bracket. An area of the housing from the retainer main body to the wire draw-out opening may be covered by the shield bracket.

For example, it is considered to increase the degree of freedom in arranging the wires not only by cutting the partition walls of the housing, but also by shortening the entire housing in a front-back direction. However, the area of the housing from the arrangement position of the retainer main body to the wire draw-out opening is covered by the shield bracket. Thus, the wires may come into contact with the shield bracket to damage coatings thereof if the housing is shortened. However, the configuration of the present invention is effective when the area from the retainer main body to the wire draw-out opening is covered by the metal shield bracket.

DETAILED DESCRIPTION OF THE PREFERRED EMBODIMENTS

A connector in accordance with an embodiment of the invention is illustrated in FIGS. 1 to 10 and is identified generally by the numeral 10. The connector 10 is to be mounted on a metal case (not shown) of a device to be installed in a vehicle. In the following description, a vertical direction is based on that in FIG. 3 and a lateral direction is based on that in FIG. 3. Further, a front-back direction is based on a lateral direction in FIGS. 4 and 5 and a side to be mounted in the case is referred to as a front side.

Figure 2:
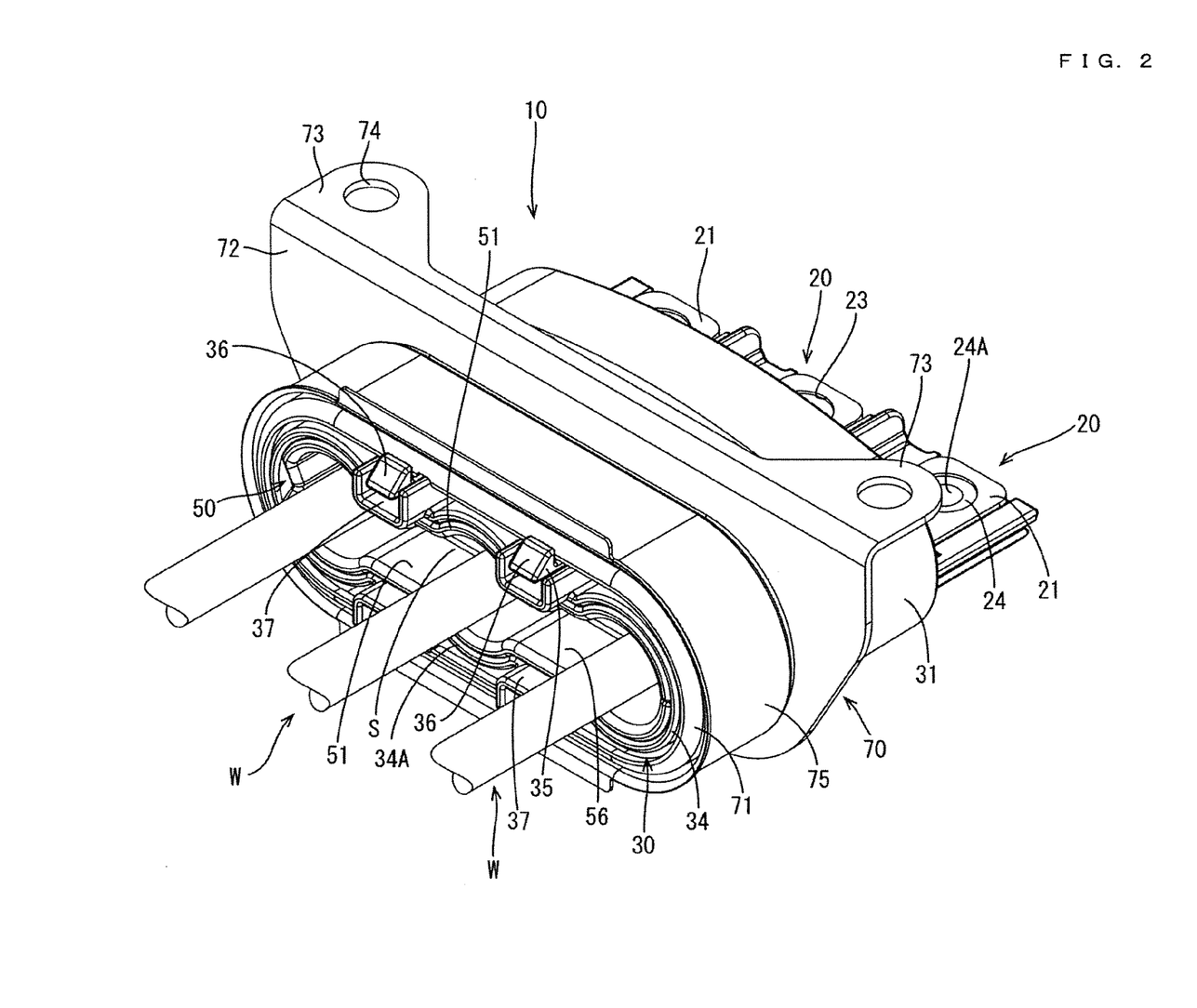
FIG. 2 is a perspective view of the connector when viewed obliquely from behind.
Figure 4:
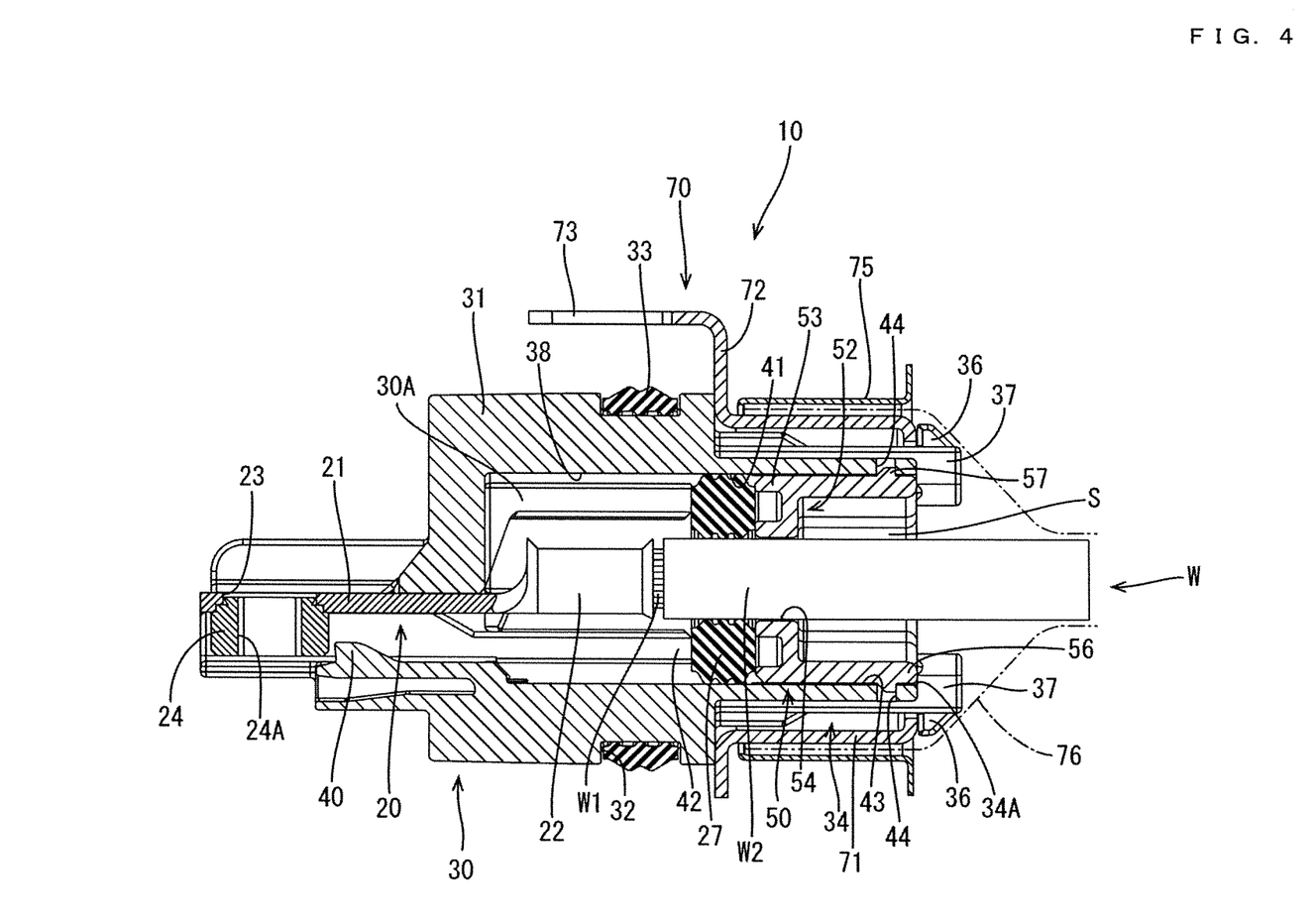
FIG. 4 is a section along A-A of FIG. 3.
Figure 6:
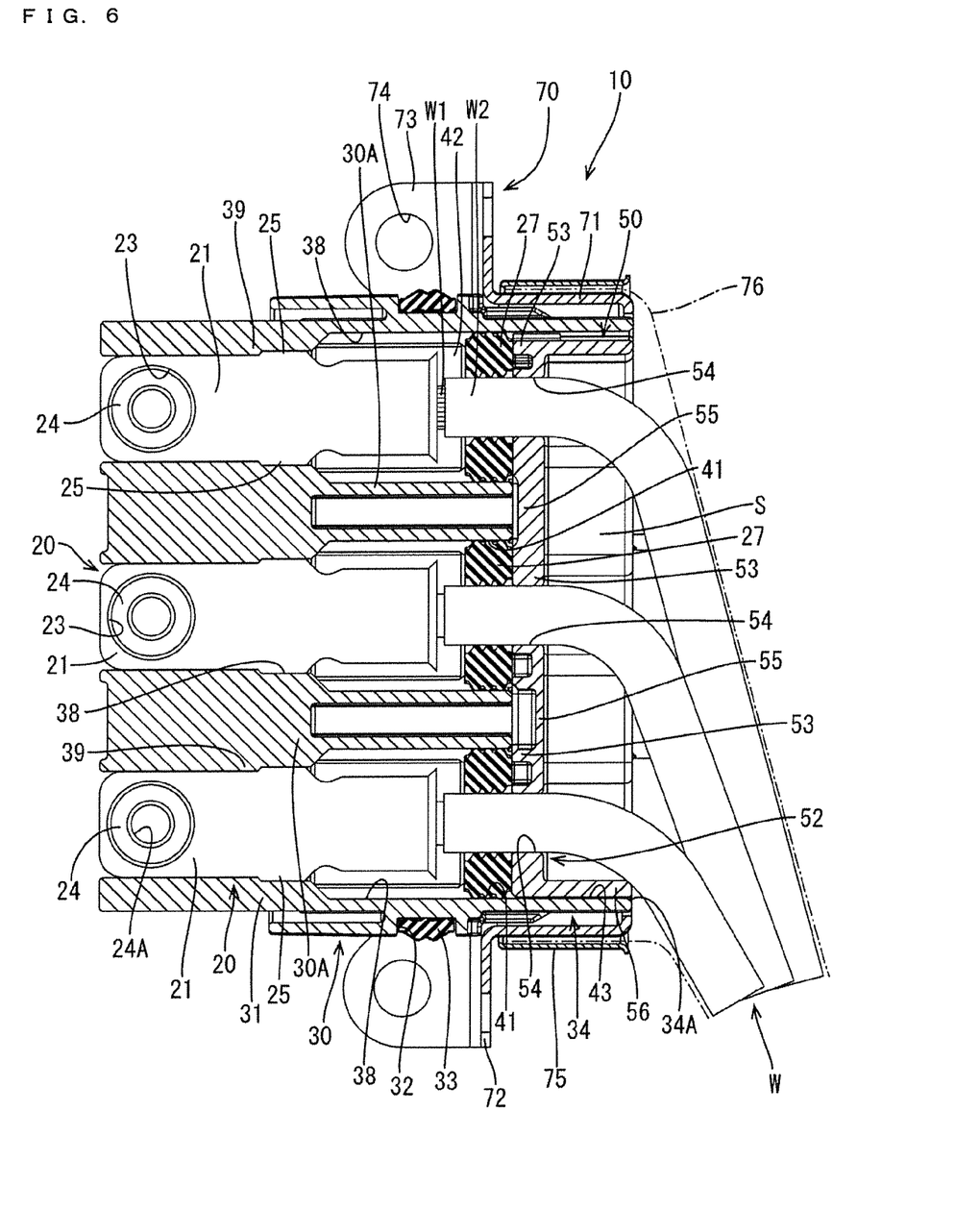
FIG. 6 is a section, corresponding to a cross-section along C-C of FIG. 3, showing a state where wires are bent.

As shown in FIGS. 2, 4 and 6, the connector 10 includes terminals 20, a housing 30 and a shield bracket 70. The terminals 20 are connected respectively to ends of wires W and are accommodated into the housing 30 from behind so that the wires W are drawn out backward. The shield bracket 70 is mounted on a rear part of the housing 30.

Each terminal 20 is formed by press-working a metal plate material with excellent electrical conductivity. Further, as shown in FIG. 4, each terminal 20 has a plate-like device-side connecting portion 21 to be connected to a device (not shown) in the case and a wire connecting portion 22 behind the device-side connecting portion 21 and configured to be connected to the wire W. A nut mounting hole 23 penetrates a front end part of the device-side connecting portion 21 in a plate thickness direction is provided on and a nut 24 including a bolt hole 24A is press-fit and fixed in the nut mounting hole 23.

The wire W has a core W1 is covered with an insulation coating W2. The insulation coating W2 is removed at an end of the wire W to expose the core W1. The wire connecting portion 22 of the terminal 20 is crimped to the exposed core W1 to connect the terminal 20 to the end of the wire W.

Figure 1:
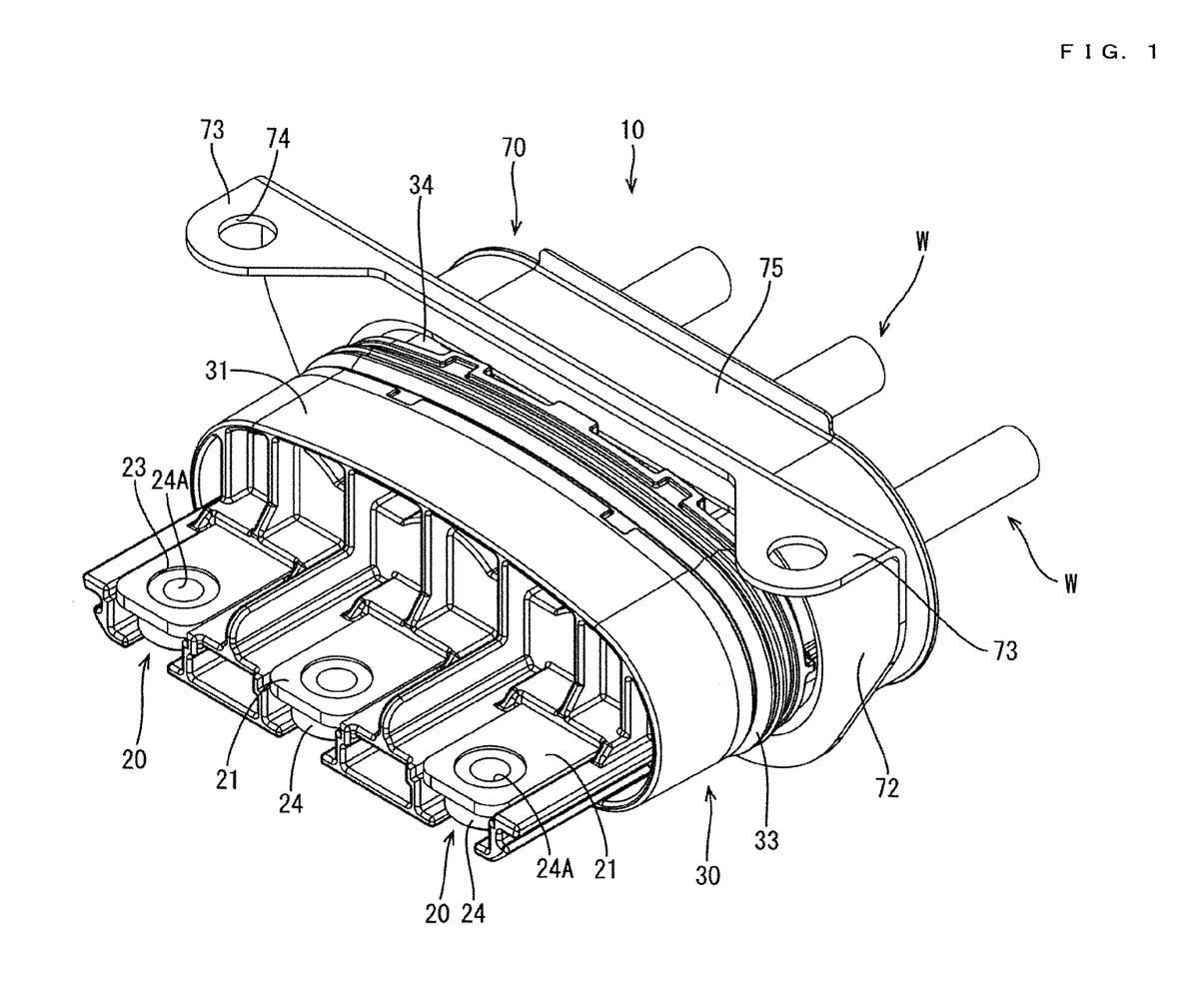
FIG. 1 is a perspective view of a connector when viewed obliquely from front.

As shown in FIGS. 1 and 2, the housing 30 has a laterally wide tubular shape. A fitting 3 is defined at a front half of the housing 30 and can fit into a mounting hole (not shown) on the case. A seal groove 32 is provided circumferentially on the outer peripheral surface of the fitting 31 and can receive an annular seal ring 33. The seal ring 33 closely contacts the outer peripheral surface of the fitting 31 and the inner peripheral surface of the mounting hole to seal between the case and the fitting 31 when the fitting 31 is fit into the mounting hole.

Figure 5:
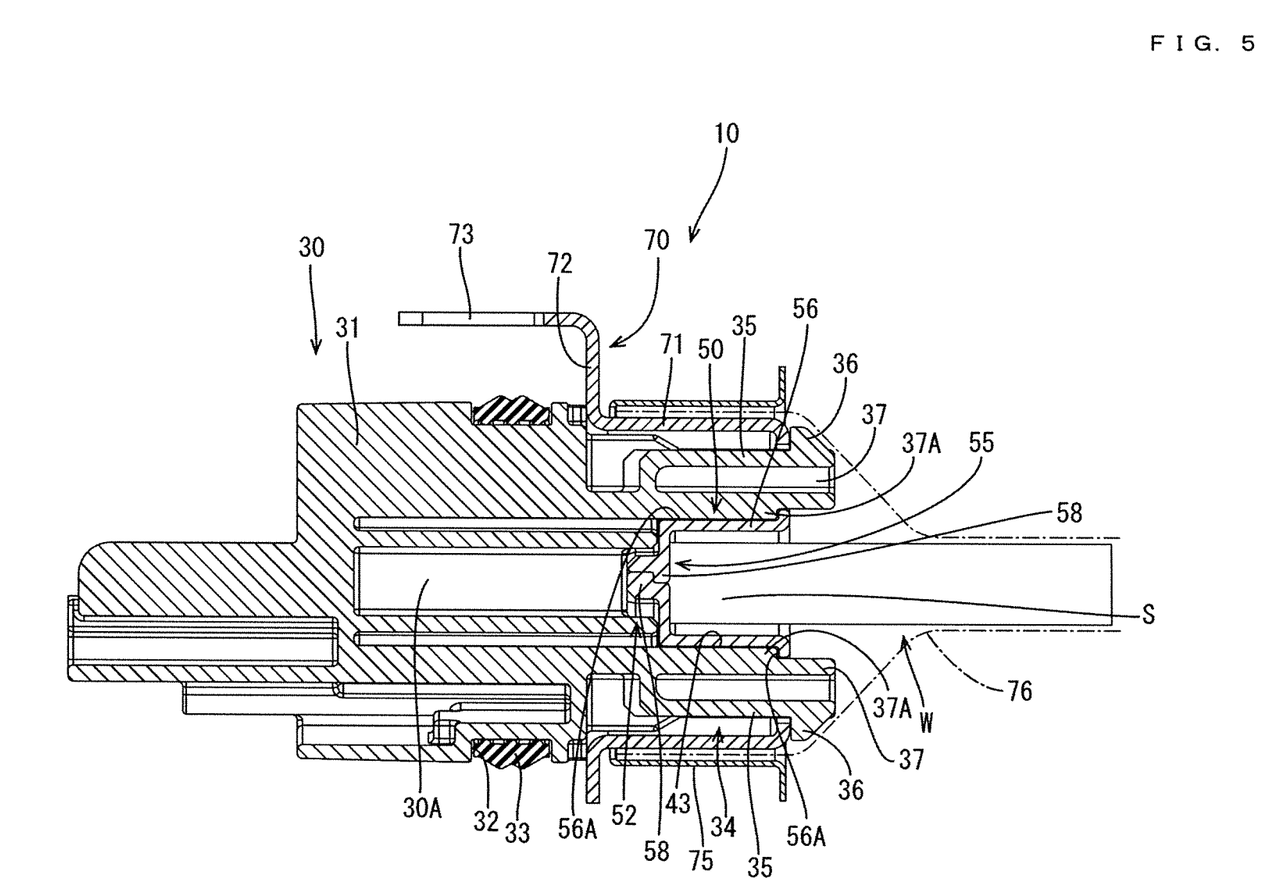
FIG. 5 is a section along B-B of FIG. 3.

A wire draw-out portion 34 is defined at a rear half of the housing 30 and opens backward, and a wire draw-out opening 34A is formed at the rear end of the wire draw-out portion 34 so that the wires W can be drawn out backward. As shown in FIGS. 4 and 5, the wire draw-out portion 34 is narrower than the fitting 31 in the vertical direction. The shield bracket 70 is mounted onto the outer periphery of the wire draw-out portion 34 from behind.

The shield bracket 70 is formed by press-working a metal plate with excellent electrical conductivity. As shown in FIGS. 4 to 6, the shield bracket 70 includes a tubular shield connecting portion 71 for completely covering the wire draw-out portion 34 over the entire periphery, a flange 72 spreading radially out from the front of the shield connecting portion 71 and plate-like mounting pieces 73 extending forward from opposite lateral sides of the upper end edge of the flange 72.

As shown in FIGS. 1 and 2, a bolt insertion hole 74 penetrates each mounting piece 73 in a plate thickness direction. Fixing bolts are inserted into the bolt insertion holes 74 and tightened into the case so that the shield bracket 70 is fixed and electrically connected to the case.

The shield connecting portion 71 is a laterally wide elliptical tube long and completely covers the wire draw-out portion 34 over the entire periphery. As shown in FIGS. 4 to 6, a tubular braided wire (shield member) 76 collectively covers the wires W drawn out backward from the wire draw-out portion 34 is mounted on the outer peripheral surface of the shield connecting portion 71. A caulk ring 75 is caulked on the outer periphery of the braided wire 76 to fix and electrically connect the braided wire 76 to the shield connecting portion 71.

Figure 3:
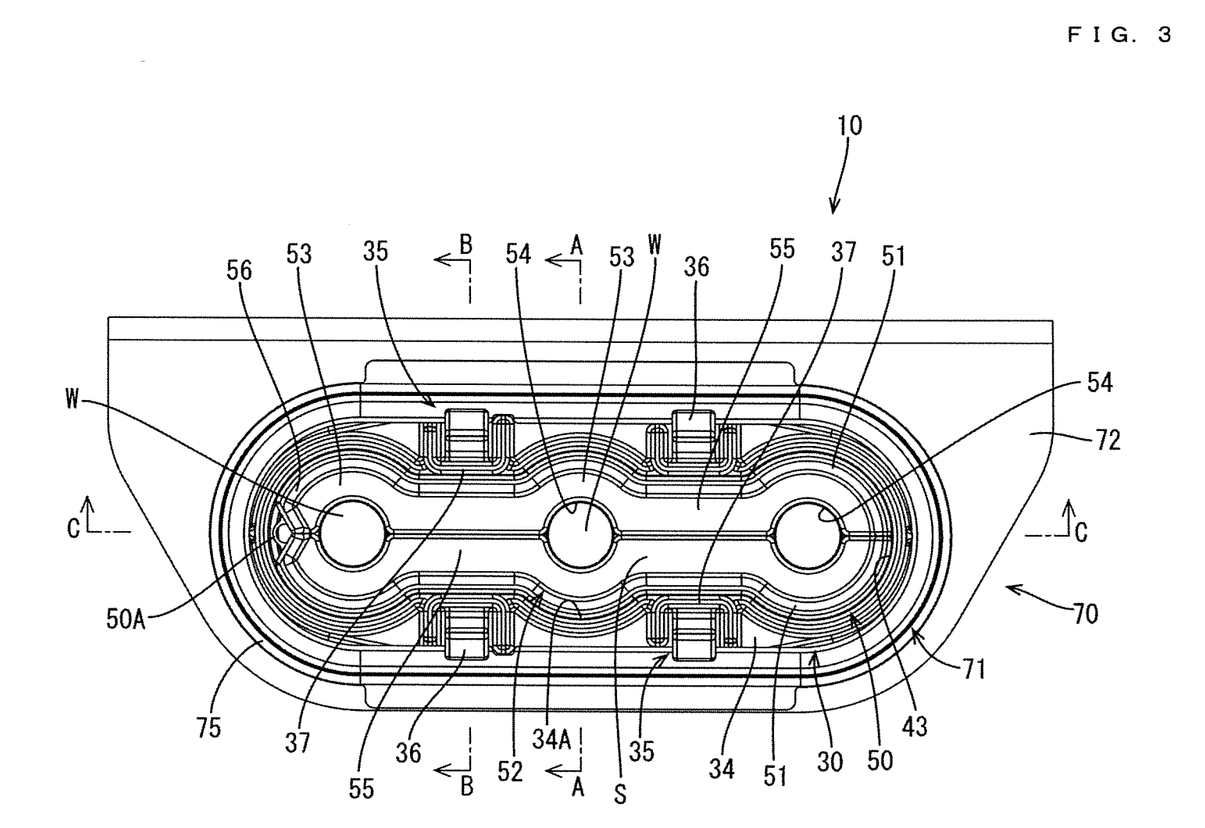
FIG. 3 is a rear view of the connector.

As shown in FIGS. 2, 3 and 5, lock pieces 35 are cantilevered back from upper and lower surfaces of the wire draw-out portion 34 and are resiliently displaceable in toward the wire draw-out portion 34. A locking claw 36 is provided on a rear part of each lock piece 35. The shield connecting portion 71 is mounted onto the wire draw-out portion 34 from behind and reaches a proper position where the flange 72 contacts the rear end surface of the fitting 31 and the locking claws 36 lock the rear end edge of the shield connecting portion 71 from behind to fix the shield bracket 70 to the wire draw-out portion 34, as shown in FIGS. 4 and 5.

As shown in FIGS. 2, 3 and 5, an excessive deflection preventing wall 37 is provided inward of each lock piece 35 in the wire draw-out portion 34 and can contact the lock piece 35 to prevent excessive inward deflection of the lock piece 35.

As shown in FIGS. 4 and 6, cavities 38 are provided in the fitting 31 and the wire draw-out portion 34 of the housing 30 to accommodate the terminals 20 in a state where the device-side connecting portions 21 of the terminals 20 project from the front end of the fitting 31. The cavities 38 are provided side by side in the lateral direction, and the respective cavities 38 are partitioned in the lateral direction by partition walls 30A extending in the front-back direction.

Locks 39 are provided on left and right inner surfaces of the cavity 38 for locking bulging portions 25 that bulge laterally from opposite left and right sides of the device-side connecting portion 21 of the terminal 20. The locks 39 engage the bulging portions 25 from the front to stop the terminals 20 that have been inserted to a proper position into the cavity 38, as shown in FIG. 6.

A locking lance 40 is cantilevered forward from a front lower part of the cavity 38, as shown in FIG. 4. The locking lance 40 is capable of locking a rear lower part of the nut 24 of the device-side connecting portion 21 from below. When the terminal 20 is inserted to the proper position into the cavity 38, the nut 24 is locked form below by the locking lance 40 and the terminal 20 is retained in the cavity 38.

A rubber plug accommodating portion 41 is provided in a rear end of each cavity 38 and can receive an annular rubber plug 27 that is fit externally on the wire W, as shown in FIGS. 4 and 6. A front stop 42 is provided in the rubber plug accommodating portion 41 and stops the rubber plug 27 that is being accommodated into the rubber plug accommodating portion 41 from behind. The rubber plug 27 closely contacts the outer peripheral surface of the wire W and the inner peripheral surface of the rubber plug accommodating portion 41 to seal between the housing 30 and the wire W.

A back retainer 50 is mounted behind the rubber plugs 27 in the wire draw-out portion 34 for collectively retaining each rubber plug, as shown in FIGS. 4 and 6.

Figure 8:
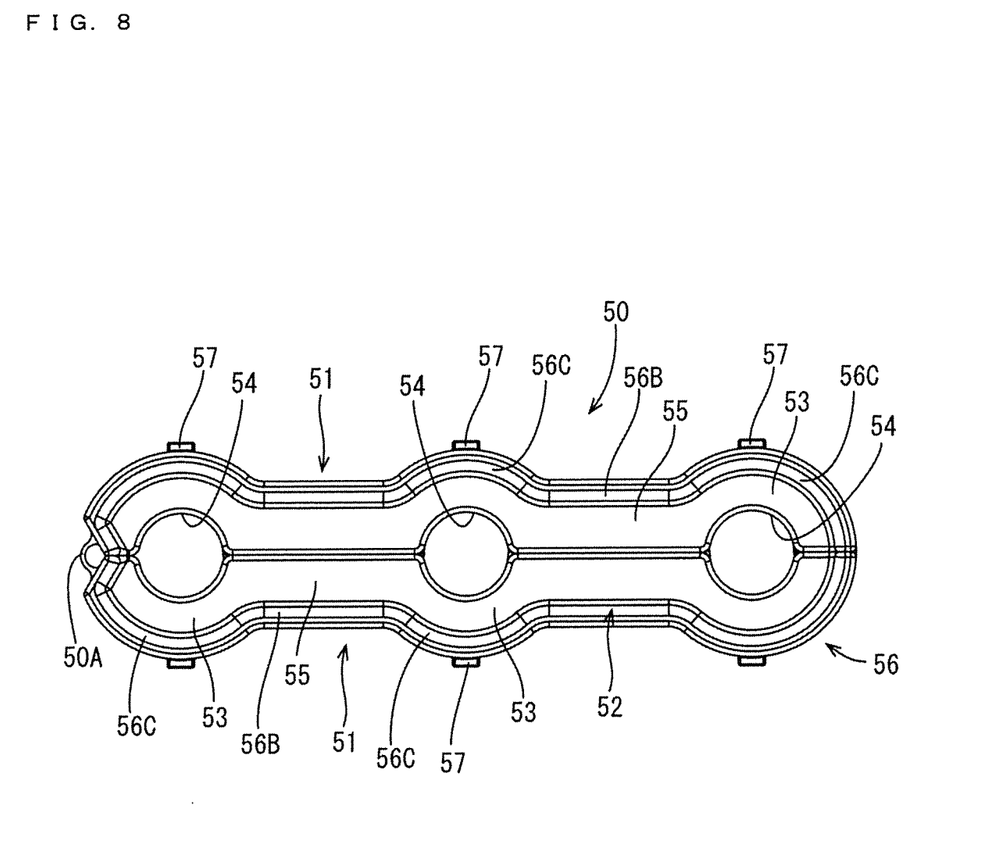
FIG. 8 is a rear view of the back retainer.

The back retainer 50 is mounted into the wire draw-out portion 34 through the wire draw-out opening 34A of the wire draw-out portion 34. Further, as shown in FIGS. 6 and 8, the back retainer 50 includes a plate-like retainer main body 52 with circular pressing portions 53 coupled in the lateral direction by couplings 55. The pressing portions 53 are to be brought into contact with the rear end surfaces of the rubber plugs 27. As shown in FIGS. 3 and 4, each pressing portion 53 has substantially the same outer diameter as the inner diameter of the cavity 38 and is thinner than the rubber plug 27. A wire insertion hole 54 is provided in a central part of each pressing portion 53 and the wire W is inserted therethrough in the front-back direction.

Each coupling 55 extends straight in the lateral direction and a height thereof in the vertical direction is slightly larger than the outer diameter of the wire W.

The back retainer 50 is formed by vertically assembling two half bodies 51 with each other, and end parts of the respective half bodies 51 on one side are coupled unitarily to each other by a hinge 50A, as shown in FIG. 8. The half bodies 51 vertically sandwich the wires W. The back retainer 50 having the wires W inserted through the wire insertion holes 54 is inserted into the wire draw-out portion 34 and reaches a proper insertion position where the pressing portions 53 contact the rear end surfaces of the rubber plugs 27, as shown in FIGS. 4 and 6, to prevent backward movements of the rubber plugs 27 and to retain the rubber plugs 27.

Figure 9:
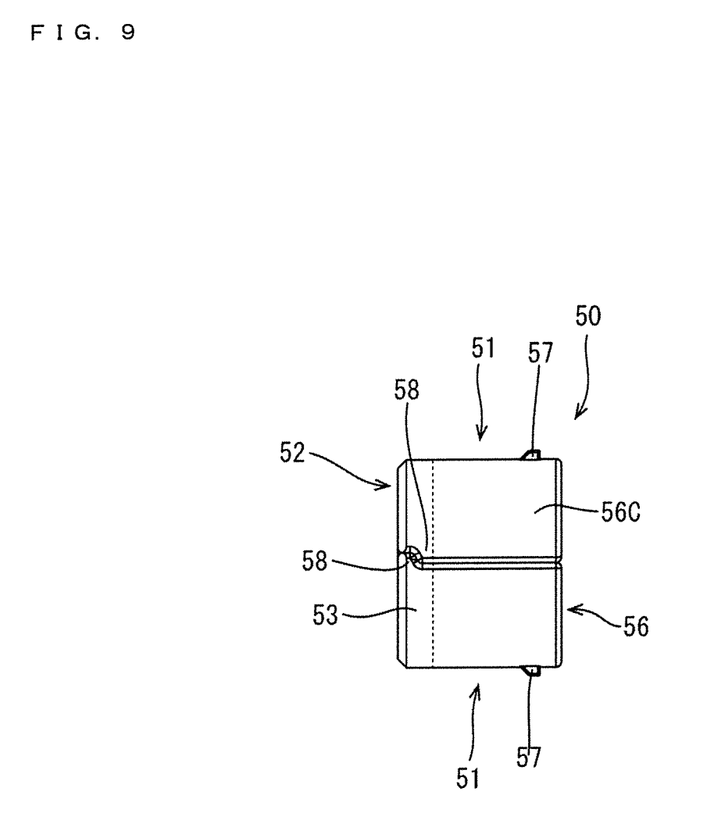
FIG. 9 is a side view of the back retainer.
Figure 10:
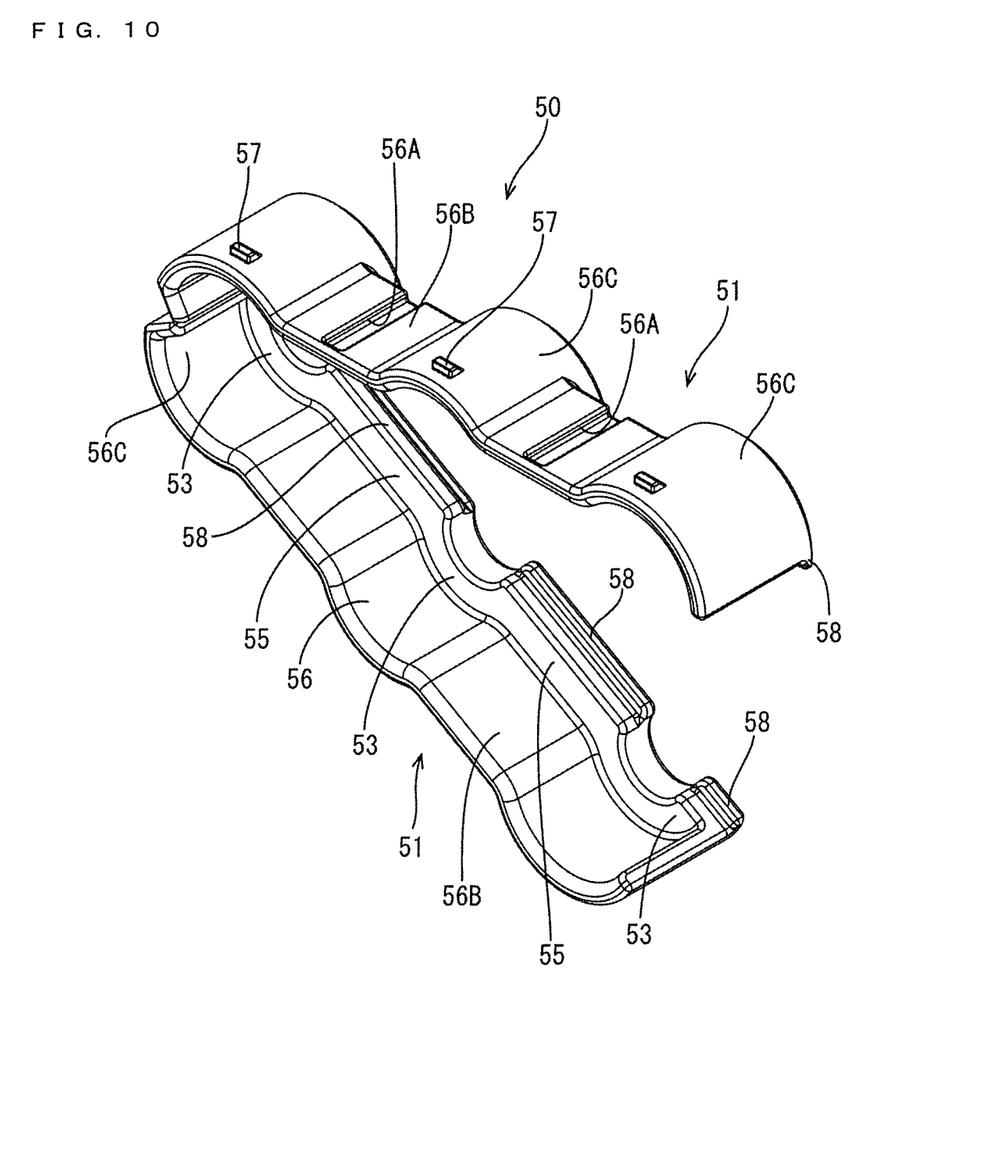
FIG. 10 is a perspective view of the vertically opened back retainer when viewed obliquely from behind.

Upper and lower butting portions 58 are provided at mating positions of the half bodies 51 and have mating surfaces that are displaced at front and rear sides, as shown in FIGS. 9 and 10. The upper and lower butting portions 58 interengage when the half bodies 51 are assembled to suppress a mutual displacement of the half bodies 51.

As shown in FIGS. 4 to 6, the rubber plug accommodating portions 41 are arranged in a front end part of the wire draw-out portion 34, and a laterally wide large cavity 43 is formed in the wire draw-out portion 34 at a position behind the rubber plug accommodating portions 41. The large cavity 43 has a size equivalent to all the cavities 38 arranged and coupled side by side by removing the partition walls 30A between the cavities 38.

On the other hand, the retainer main body 52 of the back retainer 50 is arranged in a front part of the large cavity 43 when being accommodated through the wire draw-out opening 34A and into the wire draw-out portion 34. Rear surfaces of the pressing portions 53 are located in a rear of the housing 30 through the wire draw-out opening 34A of the wire draw-out portion 34. That is, the wires W drawn out backward from the wire insertion holes 54 of the pressing portions 53 can be bent with the rear end positions of the pressing portions 53 as start points.

A guide 56 is provided over the entire periphery of the retainer main body 52 and extends back to the position of the wire draw-out opening 34A. Thus, the guide 56 can guide the retainer main body 52 to the back part of the large cavity 43 by sliding in contact with the inner peripheral surface of the large cavity 43 when the back retainer 50 is mounted into the wire draw-out portion 34. In this way, the retainer main body 52 easily can be arranged in the back part of the large cavity 43 while preventing the retainer main body 52 from being inclined into an improper posture in the back part of the large cavity 43.

Further, a space enclosed by the guide 56 defines an arrangement space S having substantially the same size as all of the cavities 38 connected in the lateral direction similarly to the large cavity 43. There is no partition wall partitioning the arrangement space S. Thus, each of the wires W drawn out backward from the pressing portions 53 can be arranged freely in the vertical or lateral direction and can be bent left or right to enter a rear side of the adjacent cavity 38.

Figure 7:
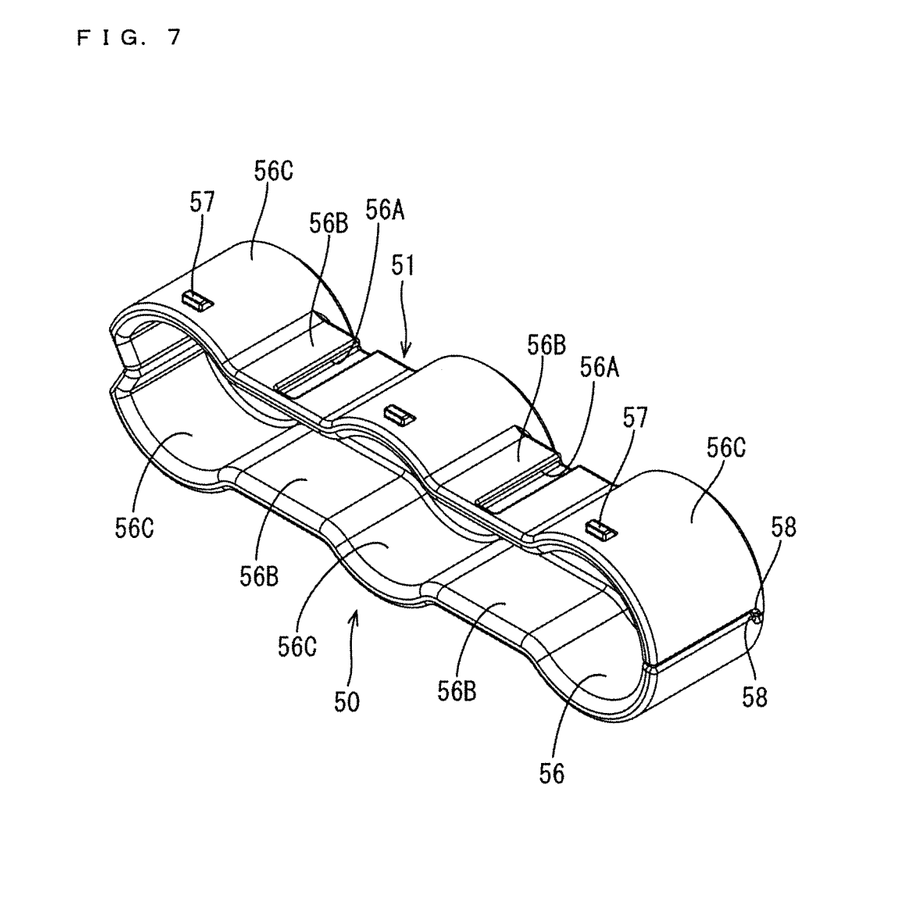
FIG. 7 is a perspective view of a back retainer when viewed obliquely from behind.

As shown in FIGS. 7 and 8, the guide 56 has flat guide portions 56B connected to the couplings 55. As shown in FIG. 7, a fitting groove 56A is provided on the outer surface of the flat guide portion 56B and extends straight back from the front end of the coupling 55. A fitting rib 37A corresponding to the excessive deflection preventing wall 37 of the wire draw-out portion 34 can fit into each fitting groove 56A from the front. Each fitting rib 37A is on a surface of the excessive deflection preventing wall 37 opposite to the lock piece 35 and is long in the front-back direction. When the back retainer 50 is mounted, the fitting ribs 37A and the fitting grooves 56A are fit to each other in the front-back direction, as shown in FIG. 5. When a large force is applied to the guide wall 56 in the lateral direction, the fitting ribs 37A and the fitting grooves 56A butt against each other to suppress a displacement of the back retainer 50.

Further, arcuate parts of the guide 56 define arcuate guide portions 56C connected to the pressing portions 53. As shown in FIGS. 7 and 8, a locking projection 57 projects each arcuate guide portion 56C. When the back retainer 50 is accommodated to the proper position into the wire draw-out portion 34, the locking projections 57 are fit respectively into locking holes 44 on the top and bottom of the wire draw-out portion 34 and hold the back retainer 50 in the wire draw-out portion 34 as shown in FIG. 4.

The connector 10 is assembled by initially inserting the wires W through the rubber plugs 24 and the shield bracket 70 in advance, and the insulation coatings W2 are removed at the ends of the wires W to expose the cores W1. The wire connecting portions 22 of the terminals 20 then are crimped to the exposed cores W1 to connect the terminals 20 to the ends of the respective wires W.

The terminals 20 then are inserted from behind through the wire draw-out opening 34A of the wire draw-out portion 34 and into the respective cavities 38 of the housing 30. The bulging portions 25 of the device-side connecting portion 21 are locked from the front by the locking portions 39 of the cavity 38 to stop the terminal 20 at the proper position in the cavity 38. Further, the locking lance 40 locks the nut 24 of the device-side connecting portion 21 from behind when the terminal 20 is inserted to the proper position in the cavity 38 so that the terminal 20 is retained in the cavity 38.

The rubber plug 27, which was fit in advance, is inserted through the wire draw-out opening 34A of the wire draw-out portion 34 and into the rubber plug accommodating portion 41 when the terminal 20 is held in the cavity 38. The front stop 42 stops the rubber plug 27 at the front of the rubber plug accommodating portion 41 so that the rubber plug 27 provides sealing between the housing 30 and the wire W.

The half bodies 51 of the back retainer 50 then vertically sandwich the wires W, and the back retainer 50 is inserted from behind through the wire draw-out opening 34A of the wire draw-out portion 34 and into the large cavity 43 of the wire draw-out portion 34. In this insertion process, the guide 56 of the back retainer 50 slides in contact with the inner peripheral surface of the large cavity 43 to guide the retainer main body 52 into the large cavity 43. Thus, the retainer main body 52 will not incline into an improper posture in the back part of the large cavity 43.

The retainer main body 52 is in the front end of the large cavity 43 and the pressing portions 53 contact the rear end surfaces of the rubber plugs 27 to prevent the rubber plugs 27 from coming out backward when the back retainer 50 reaches the proper insertion position. Further, when the retainer main body 52 is arranged in the front end of the large cavity 43, the rear end surfaces of the pressing portions 53 are in the rear side of the housing 30 through the wire draw-out opening 34A of the wire draw-out portion 34.

Further, the fitting ribs 37A of the excessive deflection preventing walls 37 and the fitting grooves 56A of the guides 56 are fit to each other in the front-back direction, as shown in FIG. 5, to suppress a displacement of the back retainer 50.

The shield connecting portion 71 of the shield bracket 70, which is fit on the wires W in advance, is mounted onto the wire draw-out portion 34 from behind. The flange 72 contacts the rear end surface of the fitting 31 to be stopped in front and the locking claws 36 lock the rear end edge of the shield connecting portion 71 from behind when the shield connecting portion 71 reaches a proper position with respect to the wire draw-out portion 34, as shown in FIGS. 4 and 5. Thus, the shield bracket 70 is fixed to the wire draw-out portion 34, and assembly of the connector 10 is completed.

The connector 10 can be fit to the case of the device by inserting the fitting portion 31 of the housing 30 into the mounting hole of the case and the flange 72 and the mounting pieces 73 of the shield bracket 70 are brought into contact with the outer surface of the case. The fixing bolts (not shown) then are inserted into the bolt insertion holes 74 of the mounting pieces 73 and tightened into the case so that the shield bracket 70 is fixed and electrically connected to the case.

A space behind the case on which the connector 10 is mounted may be narrow and all of the wires W have to be drawn out either leftward or rightward. The wires could be bent at a large angle, but loads on the wires due to bending becomes large if the wires are bent either at the position of the wire draw-out opening of the housing. Further, the wires cannot be bent left or right due to their mutual interference in addition to a large bending angle of the wires. Therefore a degree of freedom in arranging the wires may be impaired.

However, in this embodiment, the partition walls 30A between adjacent cavities 38 are cut to form the large cavity 43 and the retainer main body 52 is arranged in the back part of this large cavity 43 to form the arrangement space S behind the retainer main body 52. Thus, the wires W drawn out backward from the pressing portions 53 can be bent in the arrangement space S with the rear end position of the retainer main body 52 as a bending start position of the wires W so that the wires W can be guided to the vicinities of rear sides of the adjacent cavities 38 when being pulled out to the wire draw-out opening 34A. That is, the wires W drawn out backward from the wire draw-out opening 34A can be bent at a moderate angle, and loads on the wires W due to bending can be reduced. Further, each wire W is bent in the arrangement space S so that mutual interference of the wires W near the wire draw-out opening 34A can be reduced and the degree of freedom in arranging the wires W can be improved.

It has been considered to arrange a conventional back retainer composed only of a retainer main body in the back part of the wire draw-out portion to provide an arrangement space. However, if the back retainer is composed only of the retainer main body, operation efficiency in mounting the back retainer is reduced due to an inclined improper posture of the retainer main body in the large cavity when the back retainer is mounted.

However, the guide wall 56 is provided on the outer periphery of the retainer main body 52. Thus, the retainer main body 52 can be arranged in a proper posture in the wire draw-out opening 34 by sliding the guide wall 56 in contact with the inner peripheral surface of the large cavity 43. This can improve operation efficiency in mounting the back retainer 50 as compared with back retainers with no guide wall 56.

To increase the degree of freedom in arranging the wires W, it is considered not only to cut the partition walls of the wire draw-out portion, but also to shorten the entire wire draw-out portion in the front-back direction. However, in this embodiment, an area of the wire draw-out portion 34 from the arrangement position of the retainer main body 52 to the wire draw-out opening 34A is covered by the shield connecting portion 71 of the shield bracket 70. Thus, if the wire draw-out portion and the guide wall are shortened, the wires W may come into contact with an edge of the shield bracket 70 to damage the coatings of the wires W.

Specifically, if the area from the retainer main body 52 to the wire draw-out portion 34A is covered by the metal shield bracket 70, it is particularly effective to arrange the retainer main body 52 in the back part of the wire draw-out portion 34 and to form the arrangement space S behind the retainer main body 52.

As described above, the bending start position of each wire W is closer to the front end of the wire draw-out portion 34 than the wire draw-out opening 34A and each wire W can be bent in the arrangement space S. Thus, the wires W drawn out backward from the wire draw-out opening 34A can be bent at a moderate angle, and loads on the wires W due to bending can be reduced. Further, mutual interference of the wires W near the wire draw-out opening 34A can be reduced and the degree of freedom in arranging the wires W can be improved.

Further, operation efficiency in mounting the back retainer 50 can be improved by the guide 56.

The invention is not limited to the above described and embodiment, and the following embodiments also are included in the scope of the invention.

The guide 56 is formed over the entire outer peripheral edge of the retainer main body 52 in the above embodiment. However, a guide may be formed intermittently on the outer peripheral edge part of the retainer main body or bar-shaped guide portions may be formed on four corners of the retainer main body.

Three cavities 38 are formed in the housing 30 in the above embodiment, but two, four or more cavities may be formed in the housing.

The terminals 20 are held in the cavities 38 with the device-side connecting portions 21 projecting forward in the above embodiment. However, the entire terminals may be accommodated and held in the cavities.

The nut fixed in the device-side connecting portion is locked by the locking lance in the above embodiment. However, the terminal may be locked by fitting the locking lance into a locking hole provided on the terminal.

What is claimed is:

1. A connector, comprising:
a housing with a wire draw-out opening from which wires are drawn out;
a rubber plug accommodated in the housing and sealing between the wires and an inner peripheral surface of the housing; and
a retainer mounted into the housing through the wire draw-out opening and retaining the rubber plug, the retainer including a retainer main body for preventing a movement of the rubber plug in a direction to come out while allowing the insertion of the wires therethrough, and a position where the wires are drawn out in the retainer main body is arranged closer to a back part of the housing than the wire draw-out opening, wherein the retainer includes a guide extending from the retainer main body to the wire draw-out opening along the inner peripheral surface of the housing.

2. The connector of claim 1, wherein the rubber plug has opposite front and rear surfaces spaced apart along an insertion direction of the wires through the rubber plug to define a rubber plug, the main body of the retainer having opposite front and rear surfaces defining a thickness that is less than the rubber plug thickness.

3. The connector of claim 1, wherein:
cavities for individually accommodating the wires are provided side by side in a row while being partitioned by partition walls in the housing; and
a space where the wires drawn out from the retainer main body are arranged is continuous in an arrangement direction of the wires by cutting the partition walls between the cavities from the retainer main body to the wire draw-out opening.

4. The connector of claim 1, further comprising a metal shield bracket and a shield member for covering the wires is connected to the shield bracket, wherein:

an area of the housing from the retainer main body to the wire draw-out opening is covered by the shield bracket.

5. The connector of claim 1, wherein the housing has a plurality of cavities for accommodating terminals, the wires being connected respectively to the terminals, the retainer main body having a plurality of wire insertion holes aligned respectively with the cavities and dimensioned respectively for accommodating the wires drawn out from the cavities, the guide of the retainer defining a single arrangement space communicating with all of the wire insertion holes of the retainer and all of the cavities of the housing.

6. The connector of claim 5, wherein the cavities are arranged in a lateral direction and the wires are bent in the lateral direction within the arrangement space of the retainer.

7. The connector of claim 6, wherein the connector further has a height direction transverse to the lateral direction and transverse to an insertion direction of the terminals into the cavities, the arrangement space of the retainer having a dimension in the height direction that exceeds a dimension of the respective cavities in the height direction.

* * * * *